April 28, 1970  R. P. BEMISS  3,508,376
HEAT SEALING OF PLASTIC TRAYS
Filed May 12, 1964
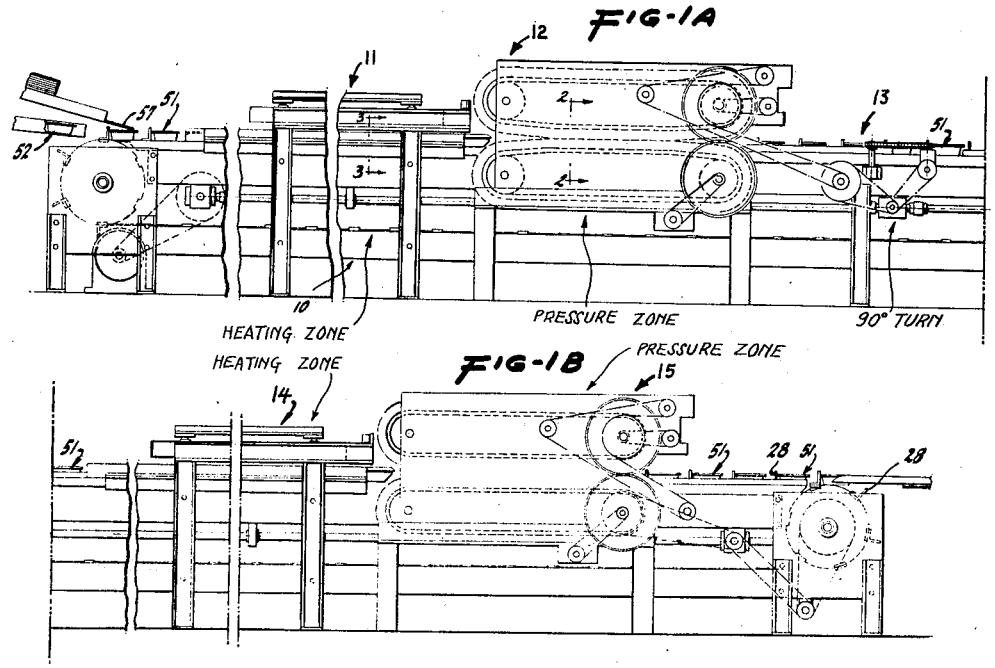
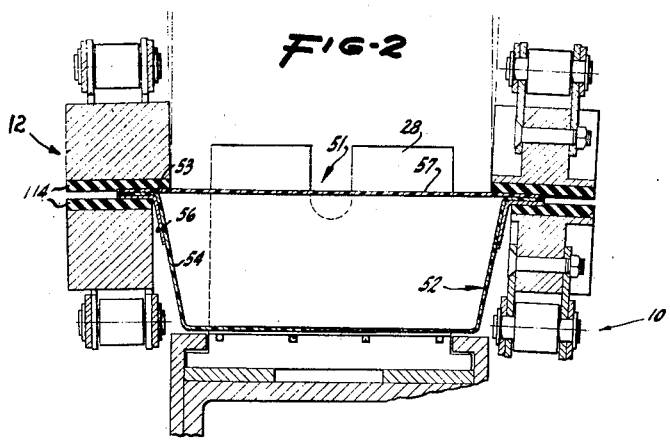
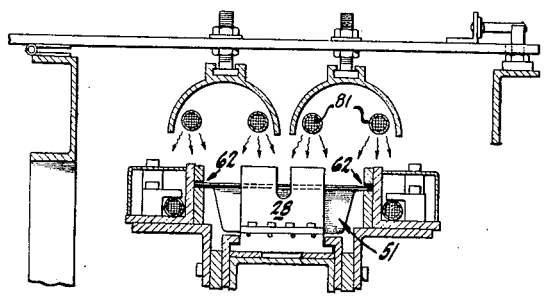
INVENTOR
ROBERT P. BEMISS
BY
Allen and Chromy
ATTORNEYS

United States Patent Office 3,508,376
Patented Apr. 28, 1970

3,508,376
HEAT SEALING OF PLASTIC TRAYS
Robert P. Bemiss, Hillsborough, Calif., assignor, by mesne assignments, to Robert P. Bemiss and Alexander Donald
Filed May 12, 1964, Ser. No. 366,877
Int. Cl. B65b 7/00; B29h 7/04
U.S. Cl. 53—39     6 Claims

ABSTRACT OF THE DISCLOSURE

A method of high production closing of plastic trays by means of thermo-plastic coated lids, wherein, during continuous travel of the trays and lids as an assembly along a path, a pair of opposite side edges or lips of the trays and lids are subjected to a heating operation and subsequently to a sealing operation. The tray with the lid attached on two side edges thereof is then rotated 90 degrees while traveling, and, while traveling is continued, the other pair of opposite edges of the tray is subjected to linear heating and linear heat sealing operation overlapping the previous heat seals at the corners. During the travel, additional heat is applied from above so as to penetrate through the lid and be available at the heat sealing surfaces of the lid.

---

The present invention relates to a method of closing a rectangular plastic tray or a box by heat sealing of a plastic or thermo-plastic coated lid thereto, wherein the tray and the lid have parallel edge portions at the sides of the rectangular tray which are opposed and which are either of a plastic, such as polystyrene, for example, and a lid which is either a plastic, such as polystyrene, or is coated with a suitable plastic material so as to be capable of heat sealing to the lip or edge of the rectangular tray.

It is a general object of the invention to provide an improved method for the heat sealing of a lid to a box or tray to provide for the packaging of articles, such as food articles, for example.

Another object of the invention is to provide an improved process of the above character in which the tray and the lid are carried in continuous motion along a linear path where successive heat and pressure steps are aplied thereto to heat seal strips along the four edges of the tray and the lid to provide a hermetic seal.

Further objects and advantages of the invention will be apparent from the following description of a preferred method of carrying out the invention, taken in connection with the accompanying drawings, in which:

FIGS. 1A and 1B disclose apparatus for carrying out the invention and are two sections of a side elevation of sealing apparatus for carrying out the invention;

FIG. 2 is a fragmentary transverse section taken as indicated by the line 2—2 in FIG. 1A; and FIG. 3 is a fragmentary transverse sectional view taken as indicated by the line 3—3 in FIG. 1A.

Referring to FIGS. 1A and 1B, the apparatus includes a longitudinal frame along which a conveyor 10 travels through a preliminary preheating zone or station 11, a pressure sealing station 12, a tray turning station 13, a second preheating zone or station 14, and a second pressure sealing station 15. The plastic package, FIGS. 1A and 2, comprises a bottom container or tray 52 which is formed of suitable plastic material (such as polystyrene, for example) and terminates at its upper end and in a horizontal lip 53, projecting out on all sides of the rectangular tray. Adjacent the lip 53 and the inclined sidewalls 54 of the tray, there is provided a reinforcing collar 56 of paper, paperboard or other similar material which is angle shaped to conform to the walls 54 and 53 of the tray and is suitably secured by heat sealing to the bottom surface of the flange by an adhesive or a thermoplastic seal. The package 51 also includes a cover or a lid 57 which, in the present case, is in the form of a paperboard rectangle having a thermo-plastic coating on its bottom surface and a suitable varnish or other coating on its top surface. The dimensions of the cover 57 correspond in all particulars to the dimensions and the rectangular shape of the side edges or lips 53 of the tray. While this particular package is shown in connection with the method, it is obvious the method can be used with other types of packages. Also, while the package is stated to be made of polystyrene, it can also be made of various other plastic materials commonly used in the packaging industry, such as polyethylene, polyvinyl, etc.

In carrying out the method, the filled trays and lid assemblies 51 are placed on the conveyor in front of the pushers 28 in a suitable manner, the lid or cover registering with the outline of the rectangular tray and its lip projecting outwardly therefrom, and the tray and lid assembly is carried through the preheating zone 11, which comprises two parallel linear zones of heat which are supplied by the two metal heat conducting tracks 62 which receive the respective opposite parallel edges of the tray and the lid in an enclosed preheating zone so as to effect a suitable softening and plasticizing of the thermoplastic material to condition it for heat sealing. These two linear parallel zones of heating are spaced apart according to the spacing of the opposed parallel strips to be heat sealed between the tray and the lid. In this preheating zone, preferably overhead heat is applied to the entire top of the lid so as to transmit heat thereto to the contacting portions of the edges or lips of the polystyrene box or tray underneath. The rate of travel and the heating temperature are controlled to provide, for example, for the thermo-plastic coating, a heat-sealing temperature in the neighborhood of 340° F., and a tray and lid assembly are carried from this preheating zone into a linear pressure zone where traveling pressure elements 114 grip the undersides of the projections or lips of the tray and the top sides of the edges of the lid at the two parallel edges disposed parallel to the path of travel, and exert pressure on these until heat sealing is effected.

Thereafter, the tray and its cover are rotated through 90° and are carried through a second preliminary heating step to condition the plastic for heat sealing and to a second pressure applying step so that the other pair of edges of the box or tray and the lid are heat sealed together in the same manner as previously described. The last two linear areas of heat sealing overlap the two linear areas from the first heat sealing step so that the tray and lid become a completely enclosed air tight container. Preferably, in each of the heat applying sections or steps, there is an overhead source 81 of radiant heat which impinges on the cover and will transmit some heat through this lid to the contact areas of the lid and the tray where the heat seal is to be effected, and this heat can be regulated in accordance with the temperature introduced into the tray prior to the sealing operation so as to compensate for any loss of heat to the contents of the tray, for example, frozen food.

The means for carrying out the above steps may be of a type disclosed and claimed in the co-pending application of Robert P. Bemiss and William W. Hansen Ser. No. 366,735, filed May 12, 1964 for Heat Sealing Apparatus, now U.S. Patent No. 3,325,969. Alternatively, the traveling track-type of pressure applying elements of the above application may be replaced with belt-type elements to apply the pressure while carrying the tray and the cover along with the pressure applying elements.

While I have described a preferred sequence of steps for carrying out the invention, the invention is capable of variation and modification from the form disclosed.

What is claimed is:

1. The method of effecting an air-tight seal between a rectangular plastic tray and a plastic or plastic coated lid therefor which includes placing the lid on the tray in aligned relation therewith, continuously advancing the tray with the lid thereon, applying heat to two parallel side edges of the lid and the tray as they are advanced continuously to condition the plastic for heat sealing, then applying pressure to said two side edges simultaneously along their entire length while continuing the advance of the tray to effect a heat-sealing operation at two opposite linear areas of contact between the lid and the tray, then while continuing the advance of the tray and the lid, turning the tray and the lid through 90°, then heating the linear area of contact between the other two side edges which have not been sealed, and then applying pressure to said other two side edges simultaneously along their entire length to effect a heat-seal therebetween the advancing movement of the tray and the lid being continued throughout the heating and the sealing steps.

2. The method of effecting an air-tight seal for a food-filled rectangular plastic tray and a plastic or plastic-coated lid therefor, which includes continuously advancing the plastic tray with the lid thereon along a substantially linear path, heating the lid and the tray along the pair of edges parallel to the path until the plastic of the lid arrives at a heat-sealing temperature while continuing the advance of the tray and the lid, then applying pressure simultaneously along the entire length of each of the two opposite side edges parallel to the path of travel to effect a heat-seal between the two linear areas of contact of the tray and the lid, then turning the tray and the lid through 90° to place the two heat-sealed edges transversely to the path of travel and the remaining edges to be heat-sealed parallel to the path of travel while continuing the advance of the tray and the lid, then applying heat to the two linear areas of the lid aligned with the corresponding linear areas of the plastic tray to be heat-sealed with respect thereto, and then applying pressure simultaneously aiong the entire length of each of said linear areas to effect a heat-seal of these two remaining edges which overlaps the heat-seal of the two first edges sealed, the advancing of the tray with the lid thereon being continuous throughout both the heating zone and the pressure zone.

3. A method of effecting an airtight seal between a rectangular plastic tray having a projecting lip around its open sides, and a plastic or plastic-coated lid therefor, which comprises establishing two parallel linear heat zones spaced apart a distance corresponding to the spacing apart of the lips at opposite sides of the plastic tray, then establishing two parallel linear pressure zones in similar spaced-apart relation and elongated in the direction of travel, carrying a tray with a lid thereon through the heating zones and the pressure zones in sequence to effect heat sealing of the lid and the tray along one pair of parallel edges, then turning the plastic tray and the lid through 90°, establishing a second parallel pair of heat zones, establishing a second pair of parallel linear pressure zones elongated in the direction of travel, and carrying the turned tray and lid through said second linear heating zones and said second linear pressure zones to heat seal the other pair of parallel edges, with the heat-sealed strips in overlapping relation with the two linear heat-sealed strips previously made thereon, the steps of heating and sealing being carried out during continuous advancing movement of the tray and lid along a linear path.

4. A method of effecting an airtight seal between a rectangular plastic tray having a projecting lip around its open sides, and a plastic or plastic-coated lid therefor, which comprises establishing two parallel linear heat zones spaced apart a distance corresponding to the spacing apart of the lips at opposite sides of the plastic tray, then establishing two parallel linear pressure zones in similar spaced-apart relation and elongated in the direction of travel, carrying a tray with a lid thereon through the heating zones and the pressure zones in sequence to effect heat sealing of the lid and the tray along one pair of parallel edges, then turning the plastic tray and the lid through 90°, establishing a second parallel pair of heat zones, establishing a second pair of parallel linear pressure zones, elongated in the direction of travel, and carrying the turned tray and lid through said second linear heating zones and said second linear pressure zones to heat seal the other pair of parallel edges, with the heat-sealed strips in overlapping relation with the two linear heat-sealed strips previously made thereon, the carrying of a tray and lid through each of said pressure zones being effected by gripping a lip and an edge of the lid from above and below throughout their length, the steps of heating and sealing being carried out during continuous advancing movement of the tray and lid along a linear path.

5. A method of effecting an airtight seal between a rectangular plastic tray having a projecting lip around its open sides, and a plastic or plastic-coated lid therefor, which comprises establishing two parallel linear heat zones spaced apart a distance corresponding to the spacing apart of the lips at opposite sides of the plastic tray, also heating the lid from above to transmit heat to and through it to the tray, then establishing two parallel linear pressure zones in similar spaced-apart relation and elongated in the direction of travel, carrying a tray with a lid thereon through the heating zones and the pressure zones in sequence to effect heat sealing of the lid and the tray along one pair of parallel edges, then turning the plastic tray and the lid through 90°, establishing a second parallel pair of heat zones, establishing a second pair of parallel linear pressure zones elongated in the direction of travel, and carrying the turned tray and lid through said second linear heating zones and said second linear pressure zones to heat seal the other pair of parallel edges, with the heat-sealed strips in overlapping relation with the two linear heat-sealed strips previously made thereon, the steps of heating and sealing being carried out during continuous advancing movement of the tray and lid along a linear path.

6. A method of effecting an airtight seal between a rectangular plastic tray having a projecting lip around its open side and a plastic or plastic-coated lid therefor adapted for coinciding and abutting relation with said tray and said lip as an assembly, which comprises heat-sealing said lip and said tray along two opposite edges of the tray and lid assembly to provide two heat-sealed strips therealong, then turning the tray and the lid therefor through 90°, and then heat-sealing another pair of strips along the other pair of edges of the tray and the lid, said respective pairs of heat-sealed strips crossing each other at the corners of the tray and lid, the steps of heat sealing being carried out by simultaneously applying pressure along the entire length of the heat sealed strips while maintaining continuous advancing movement of the tray and the lid.

References Cited

UNITED STATES PATENTS

| | | | |
|---|---|---|---|
| 3,143,837 | 8/1964 | Barr | 53—373 |
| 2,492,530 | 12/1949 | Kriegsheim | 219—10.53 |
| 3,221,473 | 12/1965 | Brown | 53—373 |

JOHN T. GOOLKASIAN, Primary Examiner

H. F. EPSTEIN, Assistant Examiner

U.S. Cl. X.R.

99—171; 156—70, 292